United States Patent [19]
Mishima

[11] Patent Number: 4,975,734
[45] Date of Patent: Dec. 4, 1990

[54] COPYING MACHINE HAVING A DISPLAYING PORTION CAPABLE OF DISPLAYING A PLURALITY OF PIECES OF INFORMATION

[75] Inventor: Nobuhiro Mishima, Osaka, Japan

[73] Assignee: Minolta Camera Kabushiki Kaisha, Osaka, Japan

[21] Appl. No.: 308,630

[22] Filed: Feb. 10, 1989

[30] Foreign Application Priority Data

Feb. 12, 1988 [JP] Japan ................................. 63-31579

[51] Int. Cl.[5] ............................................. G03B 27/14
[52] U.S. Cl. ..................................... 355/70; 355/209; 340/756
[58] Field of Search ................... 355/70, 59, 206, 209, 355/246, 326; 340/704, 762, 636

[56] References Cited

U.S. PATENT DOCUMENTS

| | | | |
|---|---|---|---|
| 4,074,515 | 2/1978 | Asano | 340/636 X |
| 4,488,149 | 12/1984 | Givens, Jr. | 340/762 |
| 4,688,929 | 8/1987 | Taniguchi et al. | 355/206 |
| 4,725,869 | 2/1988 | Umezawa et al. | 355/59 X |
| 4,751,546 | 6/1988 | Yamamoto et al. | 340/756 X |
| 4,812,875 | 3/1989 | Tanimoto | 355/218 |

FOREIGN PATENT DOCUMENTS

| | | |
|---|---|---|
| 2231129 | 7/1975 | Fed. Rep. of Germany . |
| 3706432 | 9/1987 | Fed. Rep. of Germany . |
| 58-188662 | 12/1983 | Japan . |
| 60-88972 | 5/1985 | Japan . |

*Primary Examiner*—L. T. Hix
*Assistant Examiner*—D. Rutledge
*Attorney, Agent, or Firm*—Burns, Doane, Swecker & Mathis

[57] ABSTRACT

A numerical value displaying portion comprising mosaic elements for displaying a three digit numerical value is provided on a displaying portion of an operation panel. The number of copies and the copying magnification rate are switched with each other to be displayed on the numerical value displaying portion. All of the three digits are used to display the copying magnification rate. The lower two digits are used to display the number of copies. When the number of copy is displayed, a color selection mode for the copy images is displayed by utilizing the mosaic elements of the highest digit, which is not used. The light emitting state of the element corresponding to the selected mode is made different from the light emitting state of the elements corresponding to the non-selected mode, so that the displayed mode information can be readily distinguished.

11 Claims, 6 Drawing Sheets

COPYING MACHINE HAVING A DISPLAYING PORTION CAPABLE OF DISPLAYING A PLURALITY OF PIECES OF INFORMATION

BACKGROUND OF THE INVENTION

1. Field of the Invention

The present invention relates to a copying machine and, more specifically, to a copying machine having a displaying portion capable of displaying a plurality of selected copying conditions.

2. Description of the Related Art

It has been strongly desired to decrease the number of parts of a copying machine, especially of a compact type copying machine to reduce manufacturing cost. Therefore, there have been proposed methods for displaying pieces of information by one displaying element.

For example, a method has been proposed in which whether the operation is in a duplex copying mode or not is displayed by utilizing a colon displaying portion and not the numerical displaying portion of the numerical value displaying portion constituted by segment displaying elements for displaying the number of copies (Japanese Patent Laying-Open Gazette No. 188662/1983).

A copying machine is also disclosed in which there are a plurality of paper feeding portions for feeding copying papers and which of the feeding portions is used for feeding paper is displayed by turning on the numerical value displaying portions in a prescribed shape of the said segment displaying elements displaying the number of copies and so on (Japanese Patent Lying-Open Gazette No. 88972/1985).

However, sometimes it is difficult to determine what kind of information is displayed in association with the states of display of the displaying elements therearound, when the prescribed segment displaying elements of the above described numerical value displaying portions are turned on.

SUMMARY OF THE INVENTION

One object of the present invention is to provide convenient displays in a copying machine having displaying portions.

Another object of the present invention is to provide effective displays in a copying machine having displaying portions.

A further object of the present invention is to display a plurality of pieces of information in a readily understandable manner in a copying machine having displaying portions.

A still further object of the present invention is to display a plurality of pieces of information distinguishably in a copying machine having displaying portions.

The above described object of the present invention can be attained by a displaying apparatus in accordance with the present invention, which is, in a broad sense, a displaying apparatus for an image forming apparatus, comprising mode designating means, displaying means and control means. The mode designating means designates a prescribed copying mode. The display means comprises a plurality of light emitting elements and is capable of displaying numerical data and a sign indicative of the prescribed copying mode. The control means controls the display means such that the light emitting elements are set at a first state of emission to indicate the numerical data and the light emitting elements are set at a second state of emission which is different from the first state of emission to display the sign indicative of the prescribed copying mode.

The above described objects of the present invention can be attained by the displaying apparatus in accordance with the present invention which is, in an aspect, a displaying apparatus for an image forming apparatus comprising displaying means, mode selecting means and control means. The displaying means comprises a plurality of light emitting elements, each of the light emitting elements capable of emitting light independent from each other. The mode selecting means selects either a first mode requesting display of numerical values or a second mode requesting display of information other than the numerical values. The control means controls the displaying means such that it sets the light emitting element at a first state of emission in response to an output indicative of the selection of the first mode, and it sets at least one of the light emitting elements at a second state of emission which is different from the first state of emission in response to an output indicative of the selection of the second mode by the mode selecting means.

In the copying machine structured as described above, the state of emission of a plurality of displaying portions constituting the displaying means is changed corresponding to the designated mode to display the information in association with the designated mode. Consequently, displays can be provided effectively, and the displays are readily understandable.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the present invention will be hereinafter described with reference to the appended drawings.

Schematic Structure of the Copying Machine

Figure 1:
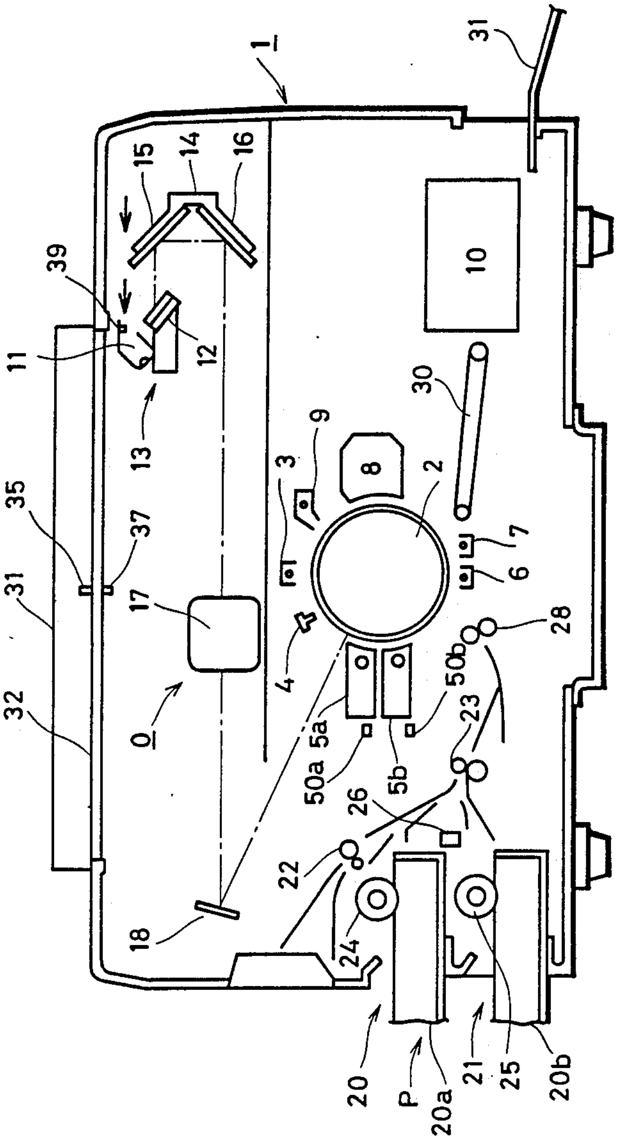
FIG. 1 is a cross sectional view showing a structure of a copying machine in accordance with one embodiment of the present invention.

FIG. 1 is a cross sectional view showing a schematic structure of a copying machine 1 in accordance with the present embodiment. An image forming portion mainly consisted of a photoreceptor drum 2 is provided approximately at the center of the body of the copying machine 1. An optical system 0 is provided above the image forming portion, and a paper feeding portion P and a fixing device 10 are respectively provided on the left side and right side of the image forming portion.

In the image forming portion, the photoreceptor drum 2 is rotatably supported and a corona charger 3, an eraser 4 for erasing charges on the spaces between images, developing units 5*a*, 5*b*, a transfer charger 6, a separating charger 7, a cleaner device 8 and a main eraser 9 are arranged around the photoreceptor drum 2.

The photoreceptor drum 2 has a photo sensitive layer on the surface thereof, which is uniformly charged when it passes through the said main eraser 9 and the corona charger 3, and image exposure is carried out by the optical system 0.

The optical system 0 is capable of scanning original images of the original placed between the platen glass 32 and an original cover 31 from under the platen glass 32. The optical system 0 comprises: a scanning unit 13 consisted of a slit exposure type light source 11 and a first movable mirror 12; second and third movable mirrors 15 and 16 gripped by a common holder 14; a lens 17 for variable scale magnification; and a mirror 18. A position lever 35 movable in the scanning direction of the scanning unit 13 is arranged near the said platen glass 32. A magnet 37 is attached to a lower portion of the position lever 35. A read switch 39 is arranged on the scanning unit 13, which switch detects the position of the magnet 37 during scanning. In this embodiment, when a simultaneous bicolor mode is selected, development is carried out with the upper developing unit 5*a* and the lower developing unit 5*b* switched so as to change the color of development at a position on a latent electrostatic image on the photoreceptor drum 2 corresponding to the position of the magnet 37, and therefore copy images are formed in two colors on one paper.

A DC motor, not shown, drives the scanning unit 13 and the common holder 14 such that the scanning unit 13 moves to the left at a velocity of (v/m) where v represents peripheral velocity of the photoreceptor drum which is constant regardless of the magnification rate and m represents copying magnification rate, and that the common holder moves to the left at the velocity of (v/2 m). When the copying magnification rate is to be changed, a lens 17 for variable scale magnification is moved on an optical axis and the mirror 18 is moved and swung by means of a stepping motor, not shown. The original images are scanned by the optical system in this manner and images are exposed on said photoreceptor drum 2 to form latent electrostatic images. Toner is applied to the said latent electrostatic images by means of the selected one of the said developing units 5*a* and 5*b*. These developing units 5*a* and 5*b* have magnets, not shown, for identifying the toner colors of the respective developing units. Meanwhile, when the developing units are mounted, read switch groups 50*a* and 50*b* are respectively arranged at positions opposing the said magnets, and the toner color can be identified by the on/off state of the read switch group. In this embodiment, two read switches are provided for one developing unit and $2^2=4$ colors can be identified by the combination of these switches. Namely, encoded signals (toner color code signals) such as black (00), red (01), green (10) and blue (11) enable identification of the color of the toner contained in the developing unit.

Meanwhile, the paper feeding portion P comprises a first cassette paper feeding portion 20 and a second cassette paper feeding portion 21. An intermediate roller pair 23, a first paper feeding roller 24, a second paper feeding roller 25 and a timing roller pair 28 constitute a conveying path of the copy papers.

The above mentioned timing roller pair 28 feeds a copy paper fed from the said paper feeding portion with the front edge thereof being aligned with the toner image forming region formed on the photoreceptor drum 2. The toner images are transferred by the transfer charger 6 onto the fed copy paper, and the paper is separated from the surface of the photoreceptor drum 2 by means of a separating charger 7. Thereafter, the copy paper is transferred by means of the conveyor belt 30 to the fixing apparatus 10 in which toner is fixed, and then the paper is discharged to the discharging tray 31 out of the copying machine.

Operation Panel

Figure 2:
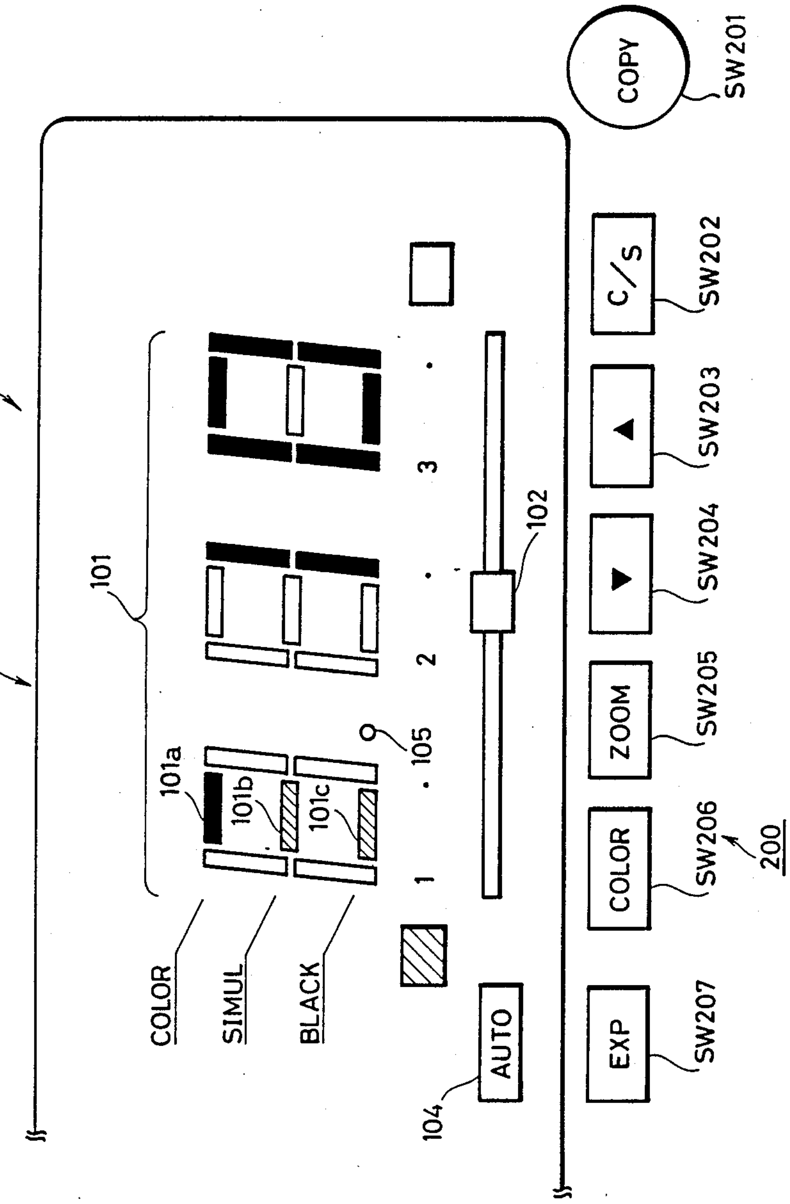
FIG. 2 is a plan view showing a portion of an operation panel of the copying machine shown in FIG. 1.

FIG. 2 is a plan view showing a portion of an operation panel of the above described copying machine 1. The operation panel 50 is consisted of a display panel portion 100 and a key switch portion 200. In the display panel portion 100, a numerical value displaying portion 101 consisted of mosaic elements for displaying a numerical value of three digits, a slide lever 102 for designating image density and an AUTO displaying LED 104 indicative of an automatic exposure mode are arranged. The numerical value displaying portion 101 comprises an arrangement of three 8-shaped LEDs each having 7 segments. The numerical value displaying portion 101 can be switched to display the number of copies and copying magnification rate. All of the three LEDs are used to display the copying magnification rate in three digits, and the middle and the right LEDs are used to display the number of copies in two digits. In addition, when the number of copies is displayed, the displaying element at the most left LEDs is utilized to display in which developing color mode the copy images are formed, as will be described in detail later.

An LED 105 representing a decimal point is provided between the middle LEDs and the left LEDs, and it is turned on when the copying magnification rate is displayed.

English letters COLOR, SIMUL (simultaneous bicolor copy) and BLACK are printed on the display panel 100 on the left side of the segment displaying elements 101*a*, 101*b* and 101*c* which are the lateral bars of the most left LEDs of the above mentioned numerical value displaying portion 101, which English letters respectively correspond to the elements 101*a*, 101*b* and 101*c*.

In the switch portion 200 arranged are, from the right side, a copy key switch 201 for starting printing; a clear/stop key switch 202 for clearing the se number of copies and for stopping the copying operation during multiple copying operation; an up key switch 203 and a down key switch 204 for incrementing and decrementing the set copying magnification rate or the set number of copies; a copying magnification rate displaying key switch 205 for switching the display from the number of copies to the copying magnification rate; a color key switch 206 for selecting one of the developing color modes for forming copy images; and an exposure key switch 207 for designating automatic exposure. The developing color mode of the copy images which can be selected by the above mentioned color key switch 206 are color mode, black mode and simultaneous bicolor mode. Either the upper developing unit 5*a* or the lower developing unit 5*b* or both of the upper and lower developing units are used for developing the latent electrostatic images of the same original corresponding to the selected developing color mode.

Figure 3:
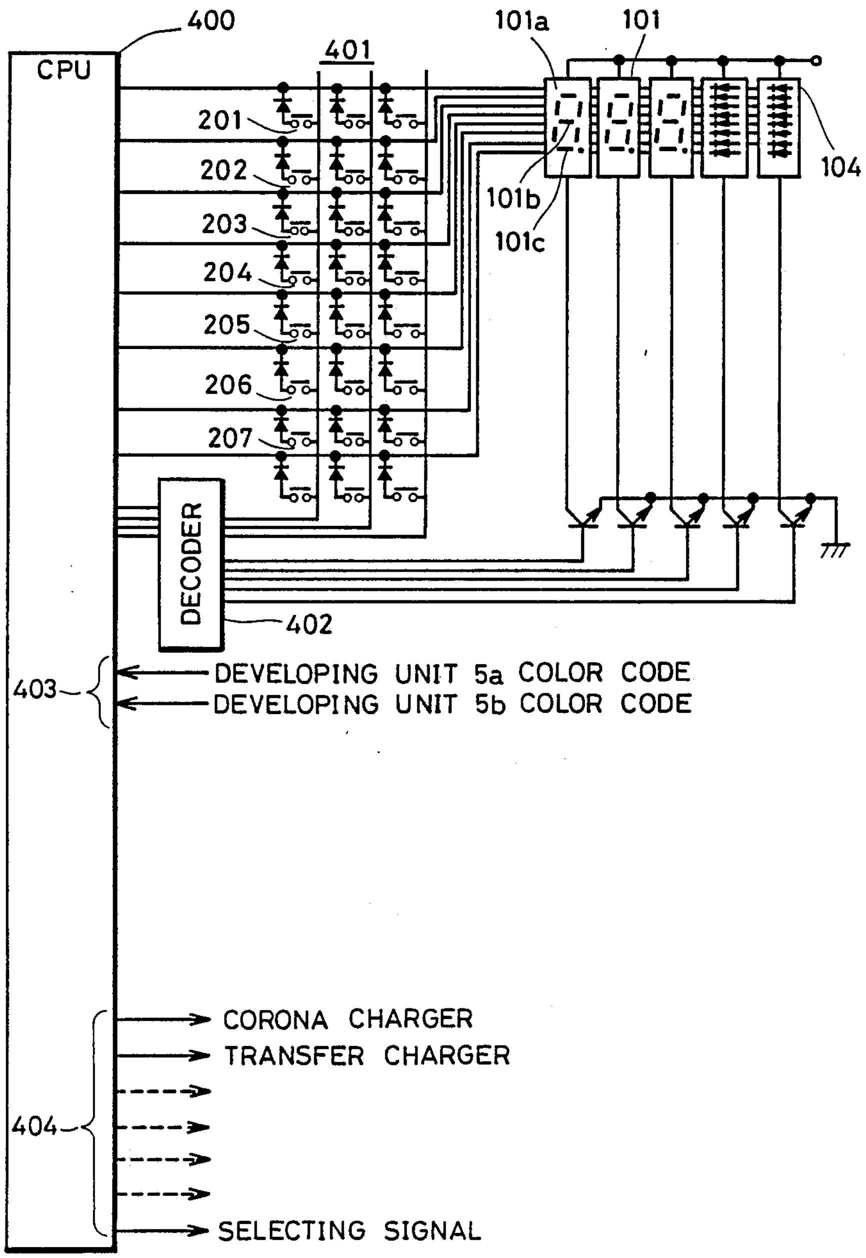
FIG. 3 shows a structure of a control circuit of the copying machine shown in FIG. 1.

FIG. 3 illustrates inputs and outputs of a control circuit controlling the above described copying machine 1. The control circuit is mainly consisted of a CPU 400. A switch matrix 401 in which the switches and the like on the operation panel 50 are arranged lengthwise and breadthwise and eliminating circuit such as the numerical value displaying portion 101 and the displaying LED 104 of the operation panel 50 of the copying machine are connected to the CPU 400 through a decoder 402.

Code signals of the toner colors of the upper and lower developing units 5*a* and 5*b* are inputted to a signal input portion 403.

Control signals are outputted from a signal output portion 404 to the image forming elements such as the corona charger and the transfer charger, and a selecting signal for selecting either the developing unit 5*a* or 5*b* in development and other signals are outputted from the output portion 404.

Control of the Copying Machine

Figure 4:
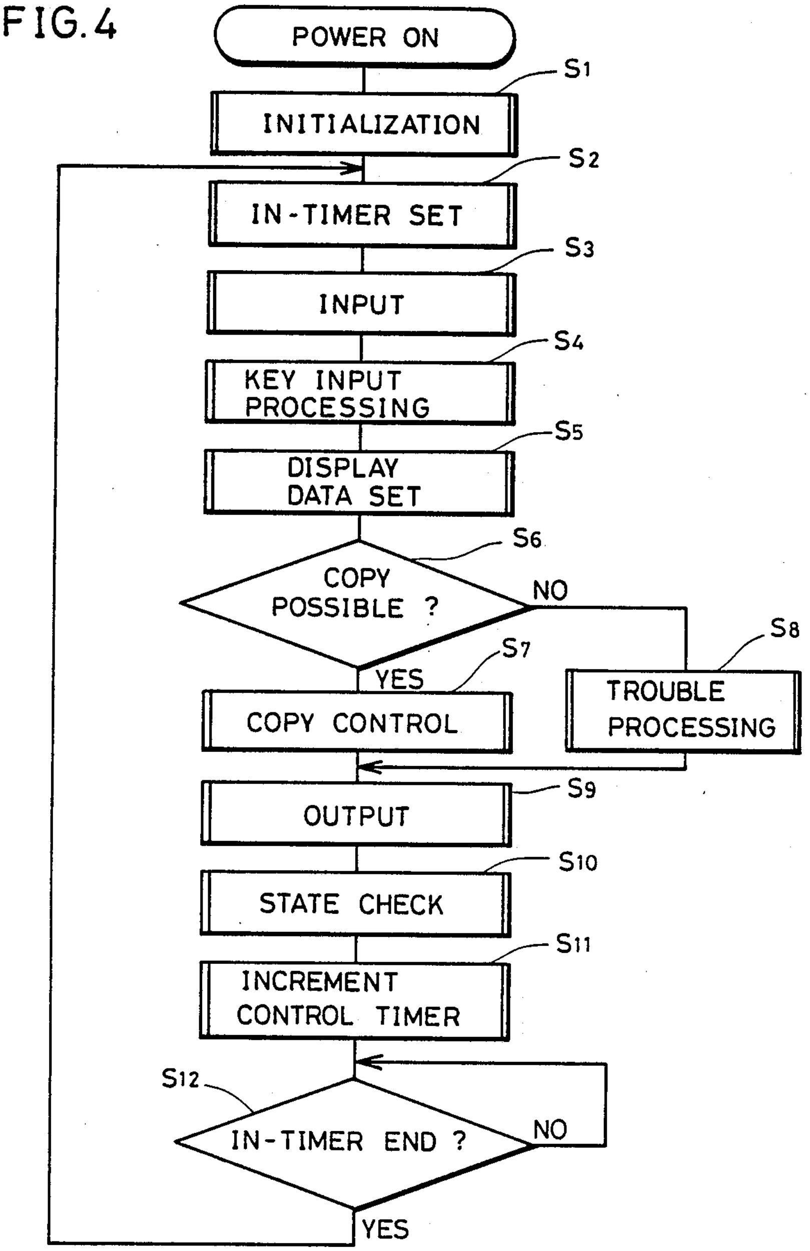
FIG. 4 is a flow chart showing a main routine of a CPU of a copying machine in accordance with one embodiment of the present invention.

FIG. 4 is a flow chart showing a main routine of the above mentioned CPU 400.

Prior to the description of the flow chart, the terms "on-edge" and "off-edge" will be defined. When the state of a switch, sensor or a signal changes from off state to on state, the change is referred to as "on-edge".

When the state of a switch, sensor or a signal changes from on state to off state, the change of the state is referred to as "off-edge".

As shown in FIG. 4, when the power of the copying machine turns on, the CPU 400 is initialized in the step S1.

In the step S2, an internal timer is set for setting time required for each routine in which the following processes are carried out.

In the step S3, signals from switches, sensors and the like arranged at respective portions of the body (for example the above mentioned operation panel 50) are inputted.

In the step S4, a key input processing routine is carried out in which the inputted key signals are processed. The details of this routine will be described later.

In the step S5, a display data process set routine is carried out. The details of this routine is also described later.

Whether or not the copying operation can be carried out is determined based on the input data in the step S6. If it is determined that the copying operation cannot be carried out due to a paper jam or a trouble, the flow proceeds to the step S8 to carry out processes to cope with the trouble and then the flow proceeds to the step S9. If it is determined that the copying operation can be carried out in the step S6, the flow proceeds to the step S7 in which processes in association with the copying operation are carried out.

In the step S9, various signals are outputted, the state of the copying machine (whether there is a jam, a trouble or the like) is detected in the step S10, and a software timer for control is counted in the step S11.

Finally, in the step S12, whether the operation of the internal timer which was set in the above described step S2 is finished or not is checked. If it is "NO", the flow is kept in a waiting state, and when it is "YES" the flow returns to the step S2.

Figure 5:
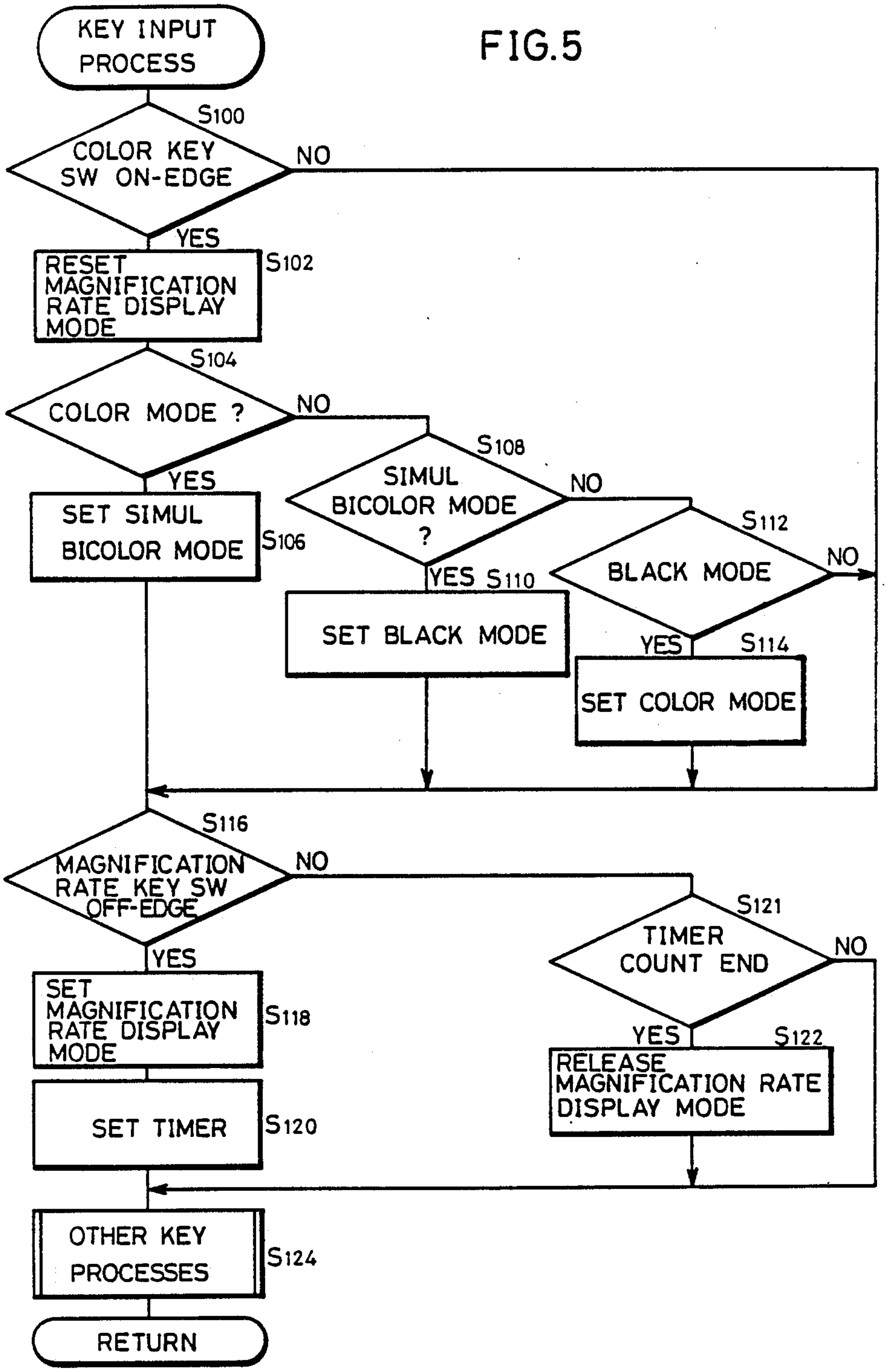
FIG. 5 is a flow chart showing contents of a key input process routine of FIG. 4.

FIG. 5 is a flow chart showing the details of the key input processing routine. As shown in FIG. 5, whether there is an on-edge of the color key switch 206 or not is checked (step S100). If there is the on-edge, a copying magnification rate display mode for displaying the copying magnification rate at the numerical value displaying portion 101 is reset (step S102).

The steps S104 to S114 corresponds to a process of selecting the color mode COLOR, SIMUL, or BLACK mode in a rotation at every input of the color key switch 206 in the step S100.

In the color mode, a developing unit containing a color toner (other than black) is used. In the simultaneous bicolor mode, the developing units are used such that first half of the latent electrostatic image is developed by the color toner and the latter half is developed by the black toner in the scanning direction with the position of the above mentioned lever 35 determining the boundary between the first and latter halves. In the black mode, a developing unit having the normal black toner is used.

More specifically, when the color mode has been selected in the step S104, then the mode is changed to the simultaneous bicolor mode (step S106). Otherwise, the flow proceeds to the step S108. If it is determined that the simultaneous bicolor mode has been selected in the step S108, the mode is changed to the black mode (step S110). Otherwise, the flow proceeds to the step S112. If it is determined that the black mode has been selected in the step S112, then the mode is changed to the color mode (step S114). Otherwise, the flow directly returns to the main flow.

Thereafter, whether there is an off-edge of the copying magnification rate key switch 205 or not is determined (step S116). If there is the off-edge of the copying magnification rate key switch 205, then the copying magnification rate displaying mode is set (step S118), and the presently set copying magnification rate is displayed on the numerical value displaying portion 101. A timer for defining a time period during which the copying magnification rate displaying mode is maintained is set (step S120), and thereafter other key processing are carried out (step S124).

If there is no off-edge of the copying magnification rate key switch 205 in the step S116, whether the counting of the timer set in the step S120 is finished or not is determined (step S121). If the counting is finished, the copying magnification rate displaying mode is released (step S122) and the flow proceeds to the step S124. If the counting has not yet being finished, the flow directly proceeds to the step S124.

Figure 6:
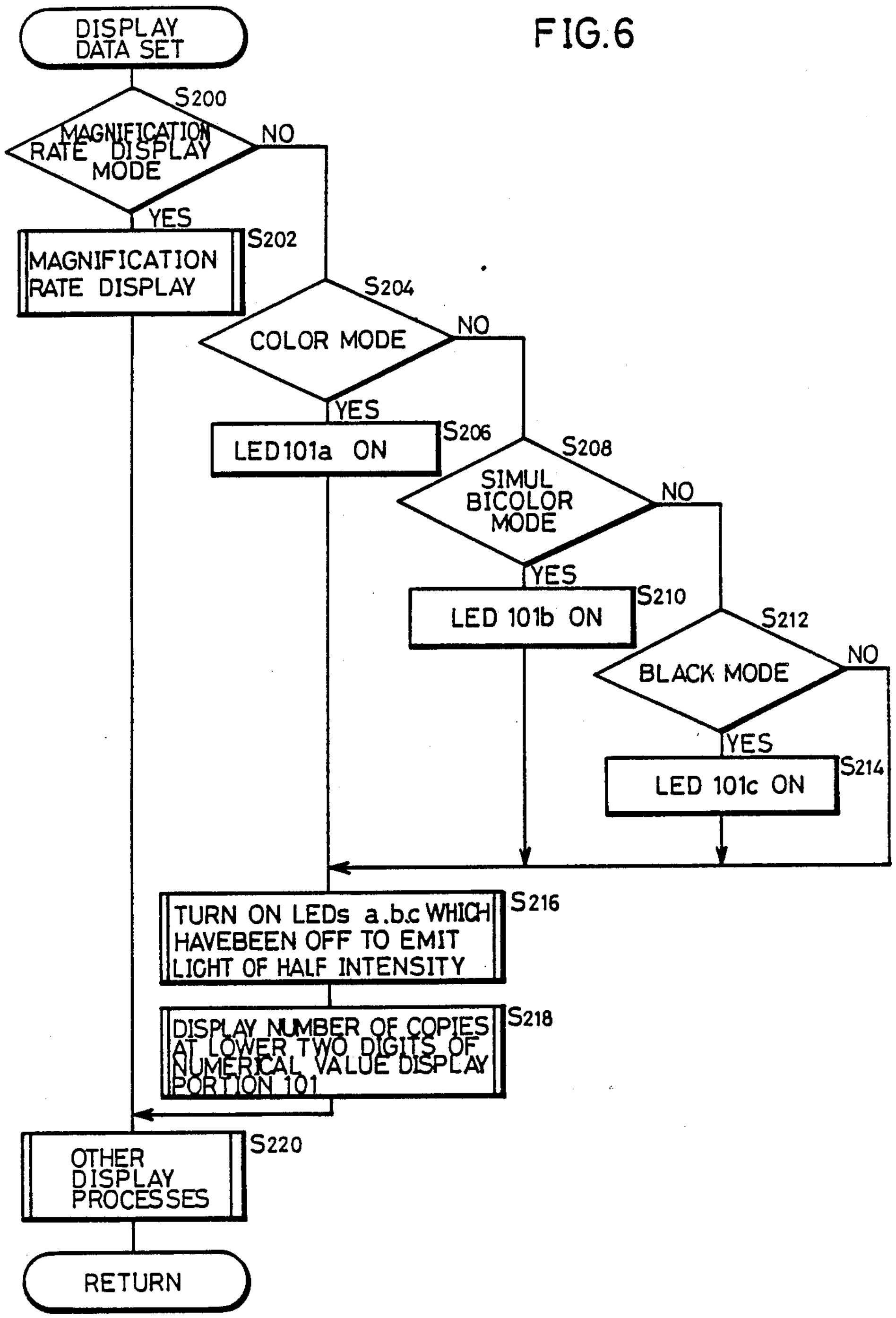
FIG. 6 is a flow chart showing the contents of the display data set routine of FIG. 4.

FIG. 6 is a flow chart showing the details of the display data set routine. As shown in FIG. 6, whether the operation is in the copying magnification rate displaying mode or not is determined in the step S200. If it is in the copying magnification rate displaying mode, the copying magnification rate is displayed (step S202).

If it is not in the copying magnification rate displaying mode, then whether it is in the color mode or not is determined in the step S204. If it is in the color mode, the LED 101*a* at the most left LEDs of the numerical value displaying portion is turned on to emit light with the highest intensity (step S206).

If it is not in the color mode in the step S204, whether it is in the simultaneous bicolor mode or not is determined in the step S208. If it is in the simultaneous bicolor mode, then the LED 101*b* is turned on to emit light with the highest intensity in the step S210.

If it is not in the simultaneous bicolor mode in the step S208, then the flow proceeds to the step S212 in which whether it is in the black mode or not is determined. If it is in the black mode, the LED 101*c* is turned on to emit light with the highest intensity in the step S214. Thereafter, the flow proceeds to the step S216 to turn on the LEDs 101*a*, 101*b* and 101*c* except that one which was turned on to emit light with the highest intensity in the above described steps S206, S210 or S214, to emit light at half intensity. The intensity of light emitted from the above described LEDs 101*a*, 101*b* and 101*c* can be adjusted by changing the duty ratio of the time for applying voltages in turning these LEDs on, that is, by changing the level of the applied voltages to adjust the brightness of the LEDs.

The set number of copies is displayed by the middle and the right LEDs of the numerical value displaying portion 101 (step S218). Thereafter, other displaying processes are carried out in the step S220, and the flow returns to the main flow.

As described in the above embodiment, among the LEDs 101*a*, 101*b* and 101*c* which display the developing color modes, the LED corresponding to the selected developing color mode is turned on to emit light with the highest intensity. Other LEDs corresponding to the non-selected developing color modes are turned on to emit light with the half intensity. Namely, when the sign indicative of the selected developing color mode is displayed by the most left LEDs of the numerical value displaying portion 101, the intensity of light emitted from the LEDs comprises two levels, namely, the highest intensity and the half intensity. Therefore, it can be understood at one sight that not the numerical value but the sign indicative of the selected developing color mode of the copy images is displayed by the most left LEDs of the numerical value displaying portion 101.

In the above embodiment, the display of the copying magnification rate and the display of the number of copies are switched to each other to be displayed on one numerical value displaying portion 101, and the above described developing color mode of the copy images is displayed by the most left LEDs which is not used for displaying the number of copies. Therefore, at least three pieces of information can be displayed by one numerical value displaying portion 101 in a readily understandable and distinguishable manner. Consequently, the number of parts required for the display can be reduced, which is very convenient especially in a compact type copying machine.

In the above described embodiment, the LEDs are used to display the sign indicative of the developing color mode which is distinct from the display of numerical value. Moreover, the display of the sign indicative of developing color mode is further distinguished by emitting LEDs with two levels of light intensity, i.e., at highest and half intensities.

Such LEDs may be employed as the LEDs 101*a*, 101*b* and 101*c* that the color of the light emitted therefrom changes corresponding to the level of the applied voltages. In that case, by changing the level of the voltages to be applied to the LED elements corresponding to the selected mode and the non-selected mode as in the above described embodiments, the colors of the LEDs are changed so that displaying form of the sign indicative of the developing color mode becomes different from the displaying form of the numerical value. The display as a whole is more distinguishable for an operator to notice that the developing color mode is being selected.

As described above, according to the present invention, out of the displaying elements constituting the numerical value displaying portion, the manner of emission of the displaying elements corresponding to the selected copying mode is different from the manner of emission of the segment displaying elements corresponding to the non-selected copying mode.

Therefore, by checking the manner of emission of the above described displaying elements, a user can readily understand that the elements are displaying the sign indicative of the copying mode and that a prescribed copying mode is selected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A displaying apparatus for an image forming apparatus, comprising:

mode designating means for designating a prescribed copying mode;

displaying means including a plurality of light emitting elements and being capable of displaying numerical value data and a sign indicative of said prescribed copying mode; and control means for controlling said displaying means, such that said light emitting elements are set at a first state of emission when said numerical value data are to be displayed, and that said light emitting elements are set at a second state of emission which is different from said first state of emission when the sign indicative of said prescribed copy mode is to be displayed wherein intensity of light emitted from said light emitting elements in said first state of emission is higher than the intensity of light emitted from said light emitting elements in said second state of emission.

2. A displaying apparatus according to claim 1, wherein said control means is activated in response to a designated output from said mode designating means.

3. A displaying apparatus according to claim 1 wherein said light emitting elements constitute at least one mosaic element.

4. A displaying apparatus as claimed in claim 1, wherein said displaying means adjusts the intensity of light emitted from said light emitting elements by changing the level of voltage applied to the light emitting elements.

5. A displaying apparatus for an image forming apparatus, comprising:

displaying means having a plurality of lighting elements for displaying a numerical value;

mode selecting means for selecting any one of copying mode from a plurality of copying modes; and control means for controlling said displaying means, such that a light element corresponding to a selected copy mode is set at a first state of emission and at least one of other lighting elements is set at a second lighting state different from said first lighting state so as to display a sign indicative of said selected copy mode in response to a selection output from said mode selecting means.

6. An image forming apparatus, comprising:

displaying means displaying a numerical value having a plurality of lighting elements each of which is capable of emitting light independent of one another;

mode selecting means for selecting any one of copying mode from a plurality of copying modes, said display means being capable of indicating each copying mode by lighting different lighting elements in a first state of emission, control means for controlling said displaying means, to display a numerical value and to display a sign indicative of a selected copying mode, said control means, when the sigh is displayed, controlling said displaying means such that the light element corresponding to the selected copying mode is set at a first state of emission and the lighting elements corresponding to unselected copying modes are set at a second state of emission different from the first state.

7. An image forming apparatus, comprising:

mode selecting means for selecting any one of copying mode from plurality of copying modes;

display means having a plurality of display portions each of which has a plurality of lighting elements for displaying numerical values and at least one of said display portions being capable of displaying a sign indicative of a selected copying mode as well, each of said plurality of copying modes respectively corresponding to a different one of said lighting elements;

control means for controlling the lighting elements of one of said display portions of said display means such that one of the lighting elements corresponding to a selected copying mode is set at a first state of emission and the lighting elements corresponding to unselected copying modes are set to a second state of emission, and for controlling lighting elements of said other display portions to display the numerical value, whereby said sign and numerical value are displayed simultaneously.

8. An image forming apparatus, comprising:

mode selecting means for selecting one copying mode from a plurality of copying modes;

display means having a plurality of display portions each of which has a plurality of lighting elements for displaying numerals, at least one of said display portions being capable of displaying a sign indicative of the copying mode selected by said mode selecting means;

control means for controlling said display means to display said sign by using one of said display portions and to display numerical values by using said remaining display portions, wherein said control means controls one of said display portions by lighting at least one of said lighting elements at a first state of emission in accordance with selection by said mode selecting means and controls said remaining display portions to display the numerical values in a second state of emission different from the first state.

9. An image forming apparatus, comprising:

display means having a plurality of display portions each of which is capable of displaying numerals by emission of light, and at least one of said display portions being capable of displaying information other than said numerals; and control means for controlling one of said display portions to display said information, and for controlling at least one of said other display portions to display said numerals so that said information and said numerals are displayed simultaneously, said control means controlling said display portions so that said display portion which displays said information and said display portion which displays said numeral are different from each other in state of emission.

10. An image forming apparatus, comprising:

a plurality of numeral display means, each of said numeral display means having a plurality of lighting elements and being capable of displaying numerals corresponding to a magnification rate for image formation and for a number of copies to be made;

selecting means for selecting a copying mode from a plurality of copying modes;

control means for controlling said plurality of numeral display means such that each of the numeral display means displays numerals to display magnification rate of image forming when the magnification rate is to be displayed, and for controlling said numeral display means to display a sign indicative of a copying mode selected by said selecting means in one of said numeral display means as well to display the number of copies to be made in the remaining numeral display means, said control means controlling said numeral display means to display the numerals in first state of emission and controlling said numeral display means which displays said sign at a second state of emission.

11. An image forming apparatus, comprising:

a plurality of numeral display means, each of said numeral display means having a plurality of lighting elements and being capable of displaying numerals;

first selecting means for selecting one of a magnification rate of image forming and number of copies to be displayed by said numeral display means;

second selecting means for selecting a copying mode from a plurality of copying modes, each of the copying modes respectively corresponding to a different one of said lighting elements;

control means for controlling said plurality of numeral display means such that each of said numeral display means displays numerals to display the magnification rate when displaying of the magnification rate is selected, and for controlling said numeral display means to display a sign indicative of a selected copying mode when displaying of the number of copies is selected as well as displaying of the number of copies;

said control means controlling one of said numeral display means in accordance with selection by said second selecting means such that the lighting element corresponding to selected copying mode is set at a first state of emission and the lighting elements corresponding to unselected copying modes are set to a second state of emission, and controlling said other numeral display means to display the number of copies, whereby the sign and the number of copies are displayed simultaneously.

* * * * *